March 27, 1951 A. N. HALE 2,546,393
SEWING MACHINE DRIVING MECHANISM
Filed Dec. 3, 1948 4 Sheets-Sheet 1

Witness.
N. Leszczak

Inventor.
ARTHUR N. HALE
By
William P. Stewart
Attorney

March 27, 1951 A. N. HALE 2,546,393
SEWING MACHINE DRIVING MECHANISM
Filed Dec. 3, 1948 4 Sheets-Sheet 2

Witness
N. Leszczak

Inventor
ARTHUR N. HALE
By William P. Stewart
Attorney

March 27, 1951 A. N. HALE 2,546,393
SEWING MACHINE DRIVING MECHANISM
Filed Dec. 3, 1948 4 Sheets-Sheet 3

Witness
N. Leszczak

Inventor.
ARTHUR N. HALE
By
William P. Stewart
Attorney

March 27, 1951 A. N. HALE 2,546,393
SEWING MACHINE DRIVING MECHANISM
Filed Dec. 3, 1948 4 Sheets-Sheet 4
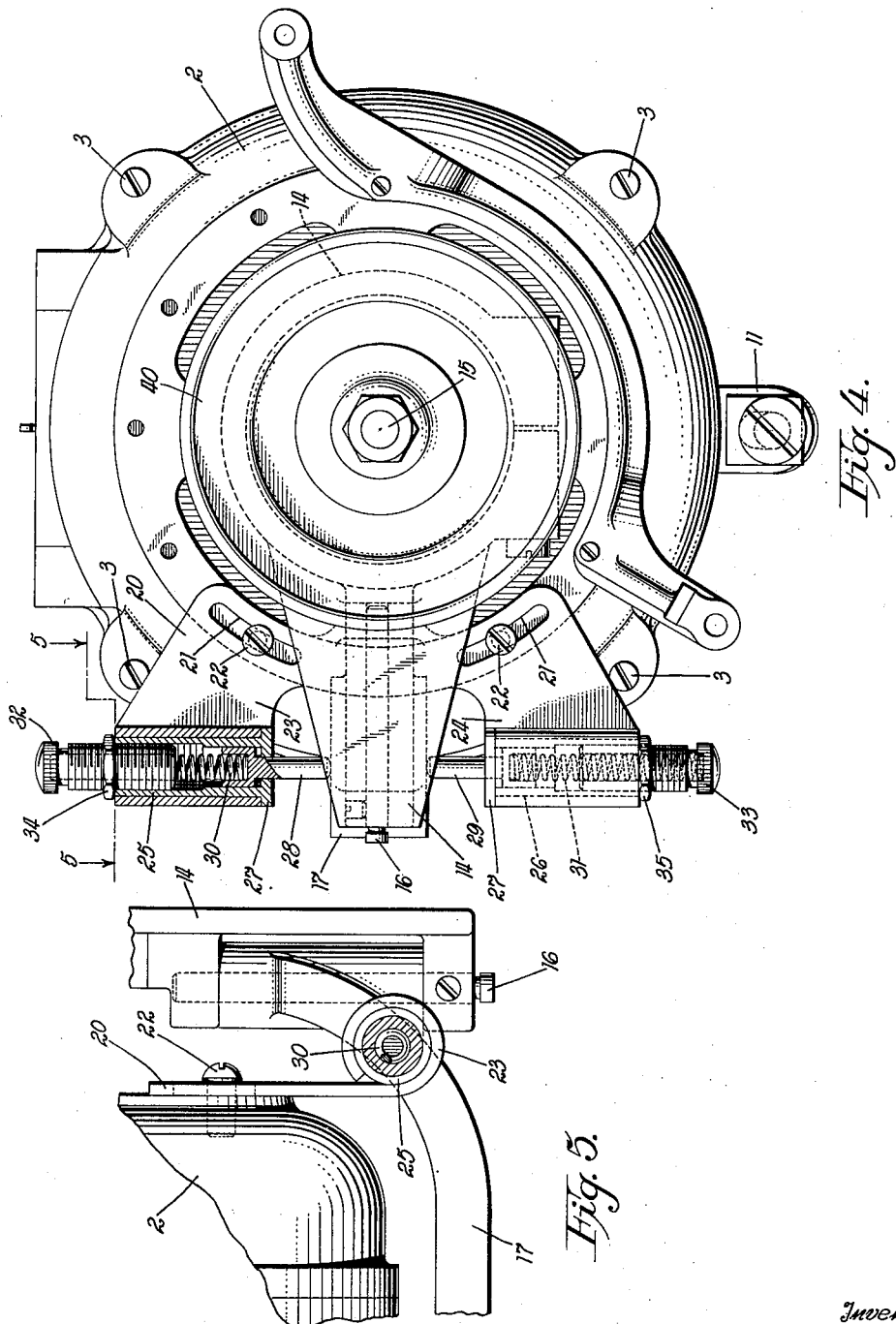
Witness.
N. Leszczak
Inventor
ARTHUR N HALE
By
William P. Stewart
Attorney Patented Mar. 27, 1951

2,546,393

UNITED STATES PATENT OFFICE 2,546,393

SEWING-MACHINE DRIVING MECHANISM

Arthur N. Hale, Stratford, Conn., assignor to The Singer Manufacturing Company, Elizabeth, N. J., a corporation of New Jersey Application December 3, 1948, Serial No. 63,295

9 Claims. (Cl. 112—219)

1

This invention relates to driving mechanism and more particularly to a brake-and-clutch driving mechanism which is particularly adapted for driving the manufacturing type of sewing machines; each machine having its own indivdual brake and clutch mechanism.

A sewing machine driving mechanism of this type commonly embodies an electric motor having a driving element actuated thereby, a brake laterally spaced from the driving element, and a driven element interposed between the driving element and the brake. The driven element is manually shiftable into engagement with either the driving element or the brake and is usually operatively connected through the medium of pulleys and a V-belt to a balance wheel carried by the main shaft of the sewing machine. This driving mechanism is mounted on the under side of a sewing machine table and the lever which controls the shifting of the driven element into engagement with either the driving element or the brake is connected to a treadle, whereby the operator may shift the driven element so as to start or stop the machine at will. When the operator stops the machine, the operating lever is automatically urged so as to cause the driven element to engage the brake and, therefore, the brake is constantly applied. When the sewing machine is stopped by application of the brake, its mechanism may come to rest with the needle, take-up, etc. in various positions. For the purpose of turning the work about the needle, removing the work from the machine, or for insuring that the take-up is at the upper end of its stroke before restarting the machine, it is common practice for the operator to apply pressure to the treadle so as to release the brake and, while the brake is released, grasp the balance wheel of the machine and turn it to bring the actuating mechanism of the machine into the desired position. Proper release of the brake and simultaneous turning of the balance wheel requires skill on the part of the operator and substantial loss of productive time.

One of the objects of this invention is to overcome this condition by the provision of adjustable means for yieldingly holding the driven element of the clutch in its neutral position or out of contact with both the driving clutch-element and the brake when the sewing machine is not in operation, whereby the balance wheel of the machine may be freely turned by hand without the necessity of moving the driven element out of engagement with the brake.

Another object of this invention is the provision

2 of a detachable neutral positioning device which may be easily and cheaply manufactured and which may be readily applied to driving devices now in use without the necessity of removing the driving device from the support.

With the above and other objects in view, as will hereinafter appear, the invention comprises the devices, combinations, and arrangements of parts hereinafter set forth and illustrated in the accompanying drawings of a preferred embodiment of the invention, from which the several features of the invention and the advantages attained thereby will be readily understood by those skilled in the art.

In the drawings,

Fig. 4 is an end elevation of the transmitter shown in Fig. 2, the belt guard being removed to expose the parts.

Fig. 5 is a fragmentary view taken substantially along the line 5—5 of Fig. 4.

Figure 1:
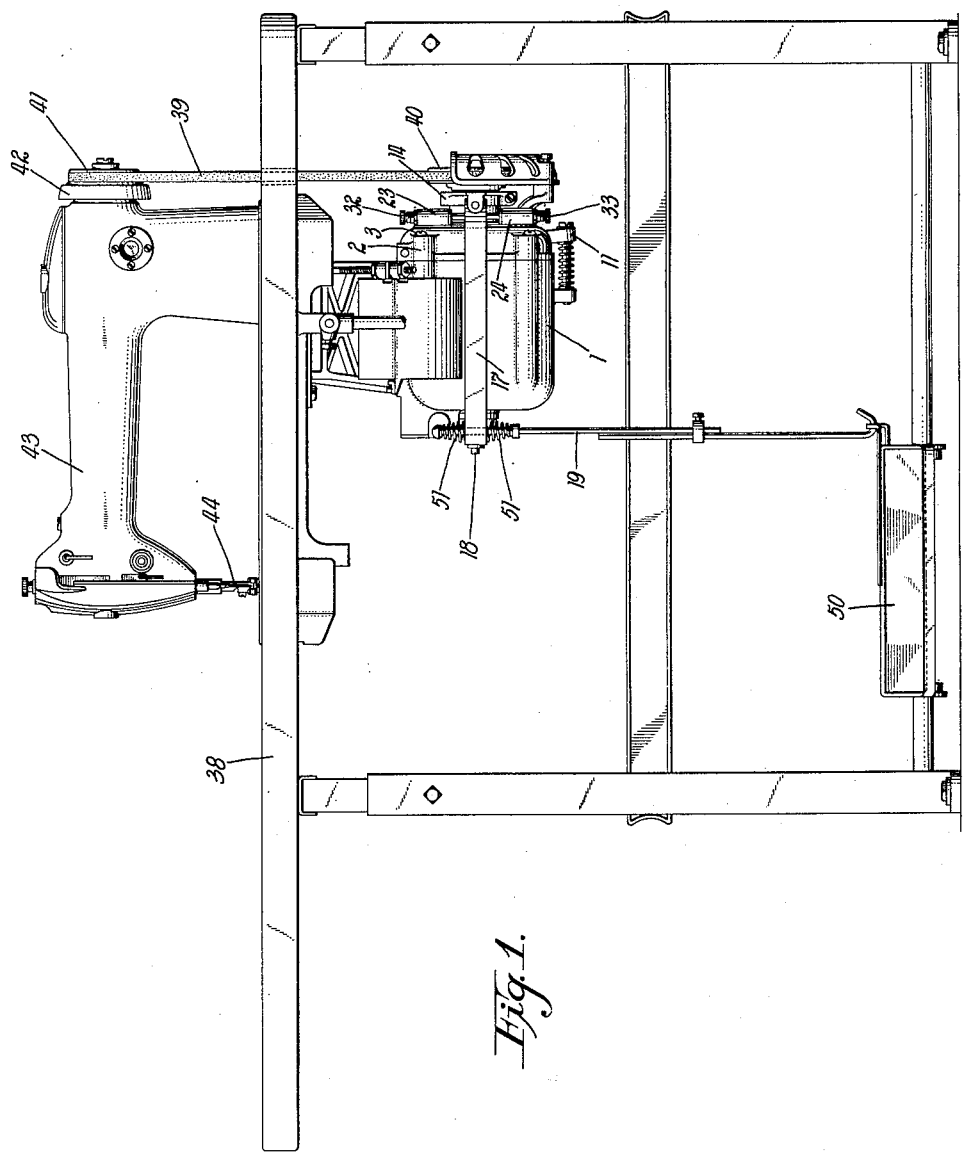
Fig. 1 is a side elevation of a sewing machine, table and driving mechanism embodying the invention.
Figure 2:
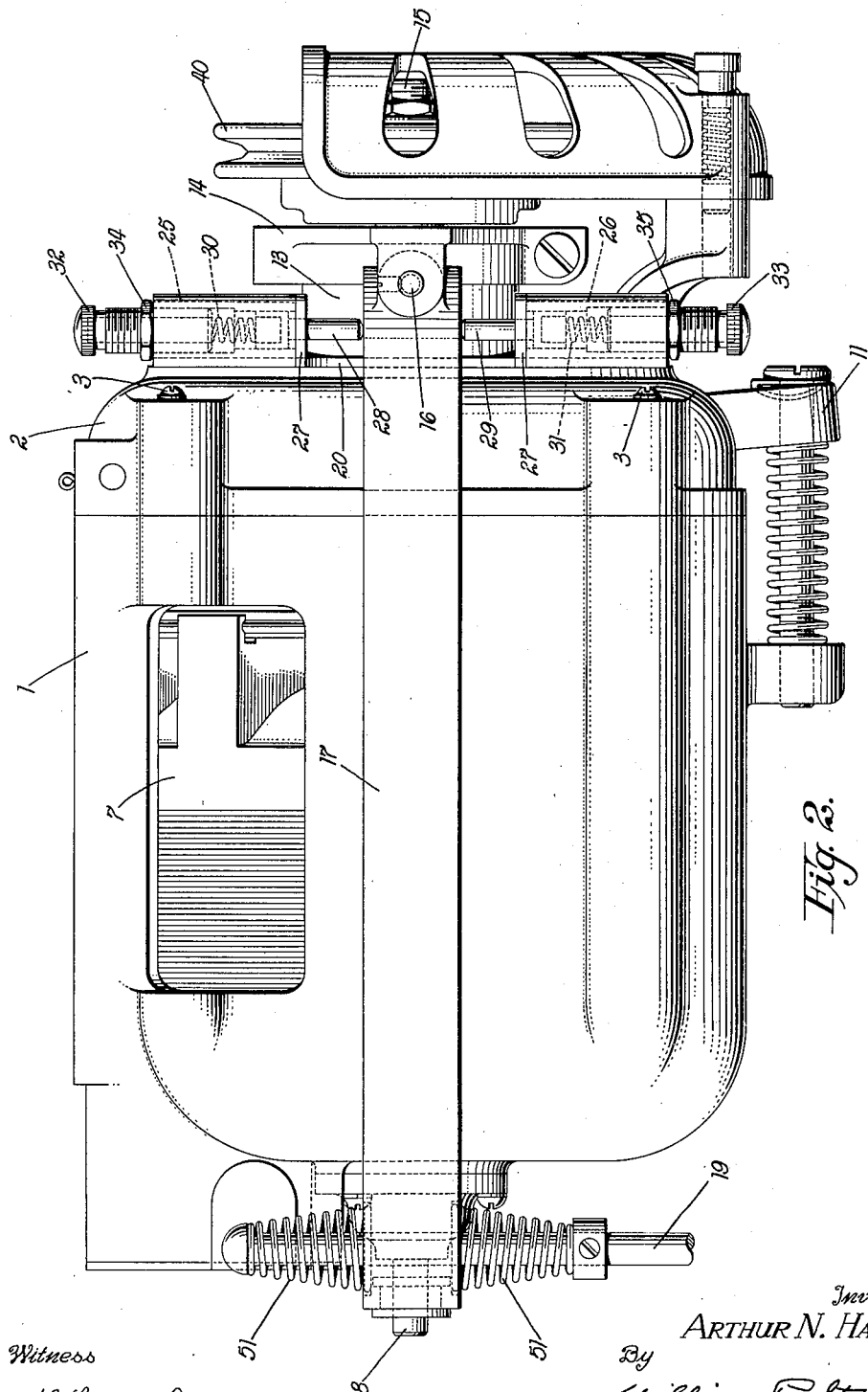
Fig. 2 is a side elevation of a driving device or electric transmitter shown in Fig. 1.
Figure 3:
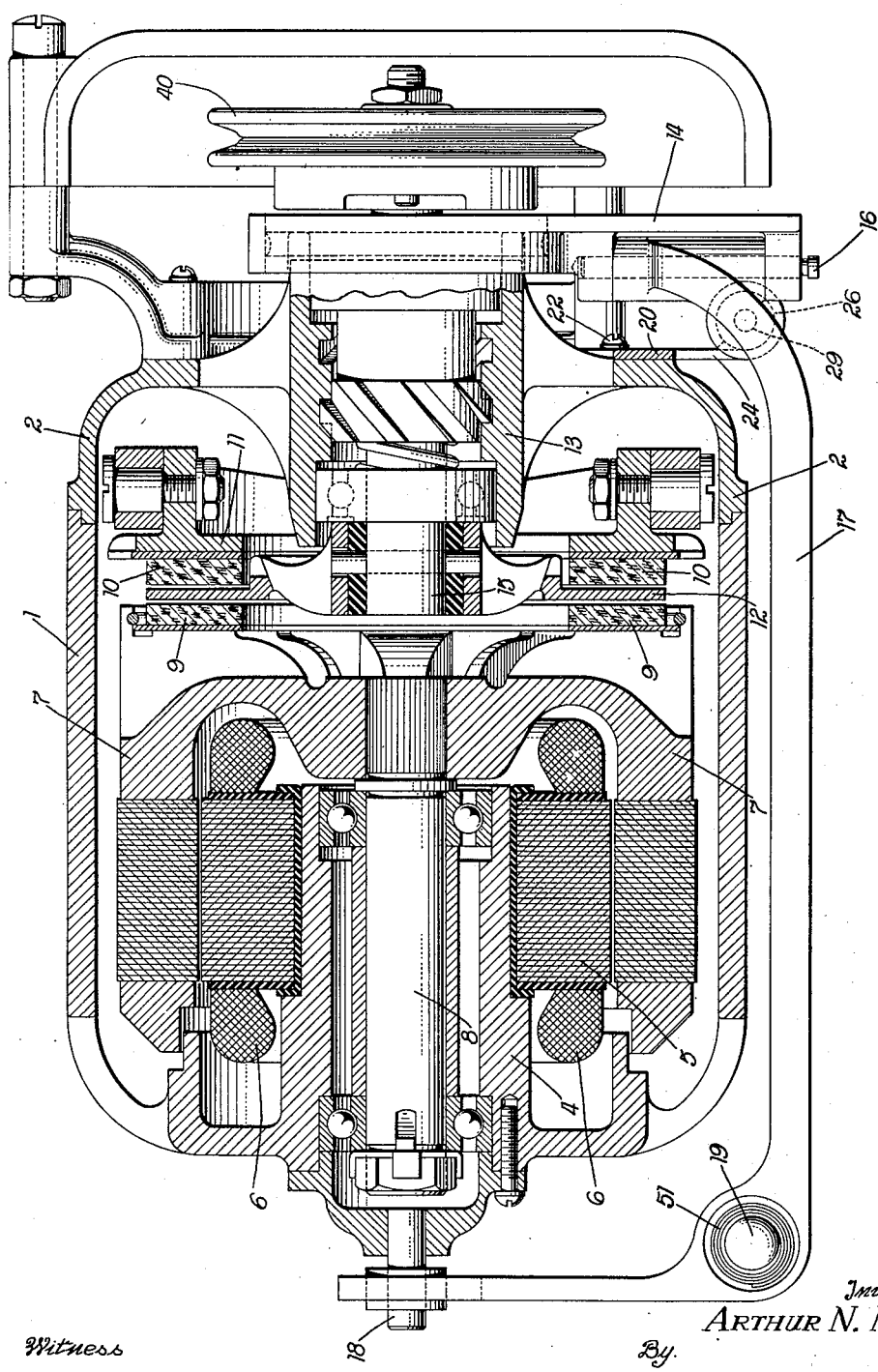
Fig. 3 is a central longitudinal sectional view of the transmitter.

In the embodiment of the invention selected for illustration our improved device is shown applied to an electric driving mechanism or transmitter comprising a frame or casing formed in two parts 1 and 2 held together by screws 3 to form a substantially cylindrically shaped hollow casing. The part 1 is formed with an inwardly extending central tubular portion 4 on which is fitted a stationary electromagnetic element 5 having the usual four-pole three-phase winding 6. A cup-shaped rotary electromagnetic element 7 is disposed externally of the stationary element 5 and is carried by a motor-shaft 8 which is journaled in bearings carried by the tubular portion 4. Secured to the rotor 7 is a friction disk 9. It will be understood that the rotor 7 and friction disk 9 act as the driving element of the clutch.

A friction disk 10, which functions as a brake, is spaced from the driving disk 9 and is carried by a brake support 11. Disposed between the driving disk 9 and the brake disk 10 is the driven element 12 of the clutch. A shaft 15 carries the driven element 12 and is journaled for endwise movement in bearings carried by the hub 13, formed on part 2 of the casing, so that endwise movement of the shaft will cause the driven element 12 to selectively engage either the driving clutch disk 9 or the brake disk 10. The means for manually shifting the driven shaft 15 endwise to shift the driven element of the clutch into engagement with either the driving element or the brake includes a lever 14 which is movable about the driven shaft 15 as a center. The above described electric transmitter is old and well known and for a detailed description of its construction reference may be had to the copending application of Edgar P. Turner, Serial No. 696,828, filed September 13, 1946, for an Electric Transmitter, and the Abel Patent No. 2,263,156, dated November 18, 1941, for an Electric Transmitter.

Secured at one end by the pin 16 to the lever 14 is an L-shaped arm 17 the other end of the arm being pivotally supported on a pivot pin 18 carried by the frame of the transmitter. It will be understood that the operating lever 14 and the arm 17 are, in effect, a single U-shaped operating lever for the transmitter and that they move together as a unit. Passing through a suitable aperture in the arm 17 is an adjustable pullrod 19 having its lower end operatively connected to a centrally pivoted treadle 50. The pullrod 19 actuates the lever 17 through two opposed beehive springs 51, the purpose of these springs being to absorb the noise and vibration of the transmitter and prevent it from being transferred to the treadle 50. It will be understood that pressure applied to the treadle by the operator's toes pulls downwardly on the arm 17 to cause the driven element to engage the driving element and pressure on the treadle by the heels pushes the arm 17 upwardly and applies the brake.

In order to yieldingly hold the operating lever of the transmitter in its neutral position so that the driven element of the clutch is out of engagement with both the driven element of the clutch and the brake, we have provided a neutral positioning device comprising a sheet metal bracket 20 formed with slots 21 which receive headed screws 22 for the purpose of adjustably securing the bracket 20 to the frame part 2. The bracket 20 has two spaced arms 23 and 24 the free ends of which are bent in the form of a cylinder which embraces the sleeves 25 and 26. The sleeves are formed with shouldered portions 27 suitably apertured to receive the diametrically opposed plungers 28 and 29 the free ends of which are adapted to contact opposite sides of the operating lever 17. The plungers 28 and 29 are each formed with enlarged cup-shaped head portions which receive one end of the compression springs 30 and 31, and the other ends of the springs extend into and react against the hollow adjusting screws 32, 33 threaded into the sleeves 25, 26. Lock-nuts 34, 35 are provided for locking the screws 32 and 33 in their adjusted position.

As shown in Fig. 1 the electric transmitter is adjustably suspended beneath the table 38. A pulley 40, fixed to the driven shaft 15 of the transmitter, is operatively connected by a V-belt 39 to a pulley 41 formed on a balance wheel 42 which is fixed to and drives the main shaft of the sewing machine 43 which actuates the sewing mechanism, including the reciprocatory needle 44. From the foregoing it will be observed that when the operating lever 14 of the electric transmitter is held yieldingly in its neutral position by the plungers 28 and 29 so that the driven clutch-element 12 is out of contact with both the driving friction disk 9 and the brake 10, the driven shaft 15 is free to turn in its bearings and the balance wheel of the sewing machine may readily be turned by hand, without the necessity of shifting the driven element out of engagement with the brake.

It will also be observed that the above described neutral positioning device may readily be applied to electric transmitters now in use and that bracket 20 is adjustable relative to the frame so that it can be shifted to a position in which the operating lever of the transmitter is yieldingly held in a position in which the driven element is out of engagement with both the driving element and the brake.

Having thus set forth the nature of the invention, what I claim herein is:

1. The combination with a sewing machine having stitch-forming mechanism including a reciprocatory needle, a power transmitter operatively connected for driving said sewing machine and including a driving clutch-element, a brake, and a driven clutch-element adapted to be alternately shifted laterally to engage either said driving clutch-element or said brake, a manually operable lever for effecting engagement of said driving and driven clutch-elements the one with the other, a bracket adjustably secured to said power transmitter, and spring means carried by said bracket and connected to said lever for yieldingly holding said driven clutch-element in a neutral position free of engagement with both said driving element and said brake.

2. The combination with a sewing machine having stitch-forming mechanism including a reciprocatory needle, a power transmitter operatively connected for driving said sewing machine and including a driving clutch-element, a brake spaced from said driving element, a driven clutch-element interposed between said driving element and said brake and adapted for lateral sliding movement to selectively engage either said driving clutch-element or said brake, manually operable means for selectively shifting said driven clutch-element into engagement with either said driving element or said brake, and yielding means normally effective for holding said driven clutch-element in a neutral position intermediate said driving clutch-element and said brake.

3. The combination with a sewing machine having stitch-forming mechanism including a reciprocatory needle, a power transmitter operatively connected for driving said sewing machine and including a driving clutch-element, a brake spaced from said driving element, a driven clutch-element interposed between said driving element and said brake and adapted alternately to be moved laterally into engagement with either said driving clutch-element or said brake, manually operable means for selectively shifting said driven clutch-element into engagement with either said driving element or said brake and diametrically opposed spring means for yieldingly holding said driven clutch-element out of engagement with both the driving element and the brake.

4. A clutch-and-brake driving mechanism for sewing machines comprising a casing, an operating lever extending laterally from said casing and adapted to selectively shift the driven element of the clutch laterally into engagement with either the driving element of the clutch or the brake and spring actuated means engageable with said lever for yieldingly holding said lever in a position in which the driven element is out of engagement with both the driving element and the brake.

5. A clutch-and-brake driving mechanism for sewing machines comprising a casing and operating lever extending laterally from said casing and adapted to selectively shift the driven element of the clutch laterally into engagement with either the driving element of the clutch or the brake, spring opposed means engageable with said lever for yieldingly holding said lever in a position in which the driven element is out of engagement with both the driving element and the brake, and mechanism for adjusting said spring opposed means relative to said lever.

6. A neutral positioning device for a clutch and brake driving mechanism for sewing machines having a frame and a manually operable lever extending therefrom comprising, a bracket adapted to be adjustably secured to the frame of the driving mechanism, spring pressed opposed plungers carried by said bracket and adapted to engage the operating lever on opposite sides thereof and means for adjusting said plungers relative to each other.

7. The combination with a sewing machine having stitch-forming mechanism including a reciprocatory needle, a power transmitter operatively connected for driving said sewing machine and including a driving clutch-element, a brake, and a driven clutch-element adapted to be shifted laterally to engage either said driving clutch-element or said brake-member, a manually controlled lever for selectively effecting engagement of said driven clutch-element with either the driving clutch-element or said brake, a bracket adjustably secured to said power transmitter, opposed springs secured to said bracket and normally effective for yieldingly holding said driven element out of contact with both the driving clutch-element and the brake and means for adjusting said springs relative to said bracket.

8. A neutral positioning device for a sewing machine clutch and brake driving mechanism having a frame and an operating lever connected to a foot operated treadle for selectively shifting the driven clutch element laterally into engagement with either the driving clutch element or the brake, comprising, a bracket adjustably secured to said frame, said bracket having spaced arms located on opposite sides of said operating lever, and adjustable springs interposed between said arms and the sides of said lever for the purpose of yieldingly holding said lever in a neutral position in which said driven element is out of engagement with both the driving clutch element or the brake when pressure is not being applied to the treadle.

9. A sewing machine clutch and brake driving mechanism comprising a frame, an electric motor carried by said frame, a circular driving clutch element actuated by said motor, a stationary brake carried by said frame, a disk shaped driven element interposed between said driving clutch element and said brake, mechanism manually operable at will for laterally shifting said disk shaped driven clutch element into engagement with either the driving clutch element or the brake, a treadle connected to operate said manual operable mechanism, and adjustable spring means connected to said manually operable means for holding said driven element out of engagement with both the driving element and the brake when said treadle is in its normal position.

ARTHUR N. HALE.

REFERENCES CITED

The following references are of record in the file of this patent:

UNITED STATES PATENTS

| Number | Name | Date |
|---|---|---|
| 955,982 | Nash | Apr. 26, 1910 |
| 1,592,762 | Geary | July 13, 1926 |
| 2,084,838 | Dobyne | June 22, 1937 |